US006454228B1

(12) United States Patent
Bosnakovic (10) Patent No.: US 6,454,228 B1
(45) Date of Patent: *Sep. 24, 2002

(54) PORTABLE VERTICAL SUPPORT

(76) Inventor: Frederick Bosnakovic, 3937 Apache St., N.W., Uniontown, OH (US) 44685

( * ) Notice: Subject to any disclaimer, the term of this patent is extended or adjusted under 35 U.S.C. 154(b) by 0 days.

This patent is subject to a terminal disclaimer.

(21) Appl. No.: 09/317,555

(22) Filed: May 24, 1999

Related U.S. Application Data (63) Continuation of application No. 08/787,681, filed on Jan. 23, 1997.

(51) Int. Cl.$^7$ ................................................ F16M 11/02
(52) U.S. Cl. .................... 248/177.1; 248/169; 248/171; 362/190
(58) Field of Search ............................ 248/177.1, 188.3, 248/188.5, 188.6, 188.8, 188.91, 188.7, 171, 370, 163.1, 166, 434, 168, 169; 362/190, 157, 414, 413

(56) References Cited

U.S. PATENT DOCUMENTS

| 23,428 | A | * | 3/1859 | Lewis ...................... 248/177.1 |
| 243,298 | A | * | 6/1881 | Perkins .................... 248/177.1 |
| 1,175,352 | A | * | 3/1916 | Hand ....................... 248/177.1 |
| 1,863,442 | A | * | 6/1932 | Goodman ................. 248/177.1 |
| 2,282,285 | A | * | 5/1942 | Olson ......................... 248/168 |
| 2,591,888 | A | * | 4/1952 | Steffen .................... 248/177.1 |
| 2,709,560 | A | * | 5/1955 | Resk ............................ 248/169 |
| 3,038,690 | A | * | 6/1962 | Alexiou ................... 248/177.1 |
| 3,064,932 | A | * | 11/1962 | Holderman .................. 248/171 |
| 5,319,365 | A | * | 6/1994 | Hillinger .................. 248/188.3 |
| 5,425,526 | A | * | 6/1995 | Shen ........................... 248/636 |

FOREIGN PATENT DOCUMENTS

| GB | 1095643 | * 12/1967 | ................. 362/190 |

* cited by examiner

Primary Examiner—Kimberly Wood
(74) Attorney, Agent, or Firm—Sand & Sebolt (57) ABSTRACT

A tripod having support legs which automatically open and close when the tripod is placed on a support surface and removed from the support surface, respectively, and having a self-contained battery. The tripod includes a telescopic center post, a plurality of downwardly extending support legs, a plurality of coupling links pivotally attached at one end to a bottom end of the center post and pivotally attached at the other end to the support legs, and a battery positioned within a hollow center of the center post. The pivotal attachment of the coupling links to the support legs is offset towards an outer edge of the support legs to bias the support legs outwardly and facilitate the automatic opening of the support legs. The outward biasing of the coupling links and support legs allows the support legs to close to a vertical position parallel and adjacent to the center post while allowing the legs to automatically open when the tripod is placed on the support surface. The battery is contained within the center post and includes an electrical cord extending within the center post from the battery to the top of the tripod. The weight of the battery and the telescopic configuration of the center post cause the support legs to automatically close when the tripod is lifted from the support surface. A base is mounted to the bottom end of the center post and unscrews to allow access to the battery.

13 Claims, 7 Drawing Sheets

PORTABLE VERTICAL SUPPORT

CROSS REFERENCE TO RELATED APPLICATIONS

This application is a continuation application of currently-pending U.S. patent application Ser. No. 08/787,681, filed Jan. 23, 1997, the disclosures of which are incorporated herein by reference.

BACKGROUND OF THE INVENTION

1. Technical Field

Generally, the invention relates to a vertical support. Particularly, the invention relates to a tripod having support legs which automatically open and close when the tripod is placed on a support surface and lifted from the support surface, respectively, and having a self-contained battery. Specifically, the invention relates to a tripod having a telescopic center post on which the support legs are pivotally mounted and in which the battery is contained, and a plurality of coupling links pivotally attached at one end to a bottom end of the center post and pivotally attached at the other end to the support legs whereby the pivotal attachment to the support legs is offset toward an outer edge thereof causing the automatic opening of the tripod.

2. Background Information

Tripods are commonly used in the video and photographic industries to support and stabilize equipment such as cameras, lights, and background screens. Typically, tripods include at least three pivotally mounted support legs movable between open and closed positions. In the open position, the support legs extend angularly downward with the three legs being separated by approximately 120 degrees. The support legs stabilize the tripod in a vertical position and prevent movement of the video equipment during use thereof. The tripods often have telescopic legs or a telescopic center post to allow a user to adjust the height of the equipment being mounted on the tripod. The legs of the tripod pivot to the closed position whereby all three legs extend generally adjacent and parallel to one another.

One problem with this type of prior art tripod is the time intensive and awkward process of pivoting the support legs to the open position. Each support leg must be independently moved to the open position and telescopically adjusted to the proper height, often while the user is carrying expensive and fragile video or photographic equipment. When the user has adjusted one of the three legs to the desired position, the tripod must be balanced on that leg while the user simultaneously adjusts the remaining legs creating an unbalanced and unstable situation. Similar problems are encountered when moving the legs from the open position to the closed position.

Several prior art tripods have been developed which disclose a mechanism to easily open the support legs of a tripod or similar structure. For example, U.S. Pat. No. 609,295 discloses a tripod for supporting a bicycle having three support legs pivotally mounted to a center post and movable between an open and closed position. The support legs are pivotally connected to an upper sleeve which slides along the center post to open and close the tripod. A set screw is attached to the sleeve to retain the legs in an adjusted position.

U.S. Pat. No. 1,456,356 discloses a rack having a center post with four support legs pivotally mounted to a runner. As the runner slides down the post, the legs pivot to a divergent position. A plurality of braces attach each support leg to an adjacent support leg and to the center post.

U.S. Pat. No. 2,709,560 discloses a tripod having upper and lower telescopically engaged cylinders with a compression spring extending within the cylinders. Three support legs are pivotally mounted to a collar which slides vertically along the outer surface of the lower cylinder to move the support legs between open and closed positions. Each support leg includes a telescopic section which allows the length of each leg to be independently adjusted. The coil spring supports a camera and the like in a relatively floating position to allow the camera to be easily raised or lowered with only a small amount of effort to be applied in the direction of desired movement.

U.S. Pat. No. 3,696,856 discloses a swivel standard for portable projection screens having tripod legs pivotally mounted on a top bracket. The bracket is loosely slidable along a center post and opens and closes the support legs as the bracket slides downward and upward, respectively, along the center post.

U.S. Pat. No. 3,841,594 discloses a collapsible projection screen which is supported by a tripod base having three collapsible support legs pivotally mounted to an upper collar. The collar slides vertically along a center post to open and close the support legs. A bracing link is pivotally attached to each leg and to a stationary bottom collar.

U.S. Pat. No. 4,705,251 discloses a self-erecting tripod apparatus having three outwardly extending legs which are attached to a lower rod which telescopically engages an upper sleeve intermediate the three legs. When the center rod is lowered onto a support surface, the support legs are automatically extended to an outward open position and when the apparatus is lifted from the support surface the support legs will collapse to a closed position under the influence of gravity. A vertically slidable collar extends around the center rod and includes a plurality of links pivotally mounted to the collar and to the support legs. The support legs move between the open and closed positions as the bottom collar moves upwardly and downwardly, respectively, along the center rod.

U.S. Pat. No. 4,826,187 discloses a collapsible monopod cart having a frame with a pair of wheels and camera mounting monopod which is offset forwardly from the axis of the wheels. The monopod has a selectively extensible and retractable ground engaging leg assembly which, when extended, forms a polygonal stabilizing base in conjunction with the wheels. The cart further includes equipment supporting surfaces and enclosure members which allow a user to carry and protect equipment on the cart even when in the collapsed position.

Although these tripods and supporting devices are adequate for the purpose for which they are intended, all but one of these prior art tripods require some degree of manual adjustment to move their support legs between the open and closed positions. Only U.S. Pat. No. 4,705,251 discloses a tripod which automatically opens when the tripod is placed on a support surface and automatically closes when the tripod is lifted from the support surface. One problem with the '251 patent is that the legs must be angled slightly outwardly even when the tripod is in the closed position biasing the legs toward the open position to facilitate the automatic opening thereof. If the legs of the '251 tripod were to extend vertically adjacent the center post when in the closed position, the downward pressure applied when the tripod is placed on a support surface will not be directed outwardly to automatically open the support legs.

The tripod of the present invention improves upon the '251 patent by offsetting the pivotal attachment of the coupling links to the support legs to bias the legs outwardly while allowing the support legs to pivot to a vertical position parallel and adjacent to the center post when in the closed position. By allowing the support legs to close to a vertical position, the tripod of the present invention requires less space than the '251 tripod to store and transport.

Another problem that photographers and videographers encounter when using various video equipment on a tripod is that the video equipment such as video cameras and lights require an external battery to operate for extended periods of time. Conventionally, the user of the video equipment would carry the battery around his or her shoulder with an electrical cord extending from the battery to the video equipment mounted on the tripod. Often the user will forget that the user is connected to the tripod by the electrical cord and will step away from the tripod pulling the tripod over and possibly damaging the expensive video equipment mounted thereon. Another method used to connect the battery to the video equipment is to strap the battery directly to the tripod using, for example, duct tape. This method puts the tripod in an unbalanced configuration allowing the tripod to be easily knocked over when bumped.

Therefore, the need exists for a tripod having support legs which automatically open and close when the tripod is placed on a support surface and when removed from the support surface, respectively, which allows the support legs to close to a vertical position parallel and adjacent to the center post when in the closed position, and which has a self-contained battery which maintains the balanced configuration of the tripod.

SUMMARY OF THE INVENTION

Objectives of the invention include providing an improved tripod having support legs which automatically open and close when the tripod is placed on a support surface and when removed from the support surface, respectively.

Another objective of the invention is to provide such a tripod with a self-contained battery for powering the equipment mounted on the tripod.

Another objective is to provide such a tripod in which the self-contained battery maintains a balanced and stable configuration of the tripod.

A further objective of the invention is to provide such a tripod in which the support legs extend vertically, parallel and adjacent to a center post of the tripod when in the closed collapsed position; and in which the tripod requires a relatively small amount of space to store and transport.

A still further objective is to provide such a tripod which is free of springs and the like; and which uses the force of gravity to automatically close the support legs.

Another objective is to provide such a tripod in which coupling links extend between the support legs and the center post; and in which the coupling links are offset slightly outwardly to facilitate the automatic movement of the support legs to the open position when the tripod is placed on the support surface.

A further objective of the invention is to provide such a tripod in which an electrical cable extends within the center post from the battery to a position adjacent to the video equipment being mounted on the tripod.

Another objective is to provide such a tripod, which achieves the stated objectives in a simple, effective and inexpensive manner, and which solves problems and satisfies needs existing in the art.

These and other objectives and advantages are obtained by the vertical support of the present invention, the general nature of which may be stated as including a post having a top and a bottom; the post including an upper section and a lower section; the lower section telescopingly engaging the upper section; at least two legs having an inner edge and an outer edge; each of the legs being attached at a first pivot to the upper section of the post; the legs being movable between open and closed positions; each of the legs having a longitudinal center line with the inner edge and outer edge disposed on either side of the center line; a coupling link attached to each leg; the coupling link having a first end and a second end; the first end of the coupling link connected to the lower section of the post; the second end of the coupling link connected to the leg at a second pivot; and the second pivot being positioned adjacent the outer edge of the leg outside the center line of the leg so as to outwardly bias the links with respect to the legs so that the legs automatically move to the open position when the central post is placed on a support surface.

These objectives and advantages are also obtained by a vertical support including a center post having a top and a bottom; the center post including a lower section and an upper section; the upper section of the post sliding inside the lower section; at least two legs attached at a first pivot to the upper section and movable between open and closed positions; a coupling link attached to each leg; the coupling link having a first end and a second end; the first end of the coupling link connected to the lower section of the post; the second end of the coupling link connected to the leg; the lower section of the post being in a first position when the legs are in the open position and a second position when the legs are in the closed position; and the first position of the lower section of the post being closer to the first pivot than the second position of the lower section of the post.

Still other objectives and advantages of the invention are achieved by a method of setting up and collapsing a vertical support on a surface, the method including the steps of providing a support having a center post having a lower section and an upper section; the lower section of the post having a lower end; the upper section of the post sliding with respect to the lower section of the post; at least two legs attached at a first pivot to the upper tubular section and movable between open and closed positions; a coupling link attached to each leg; the coupling link having a first end and a second end; the first end of the coupling link connected to the lower section of the post above the lower end of the lower section post; and the second end of the coupling link connected to the legs; placing the lower end of the lower section on the surface and lowering the upper section of the post causing the legs to move from the closed position to the open position to set up the support; grasping any portion of the upper section of the post; and lifting the upper section of the post away from the lower section of the post causing the legs to move from the open position to the closed position; the grasping and lifting steps being free of the step of releasing a clamping mechanism that holds the upper section of the post with respect to the lower section of the post.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
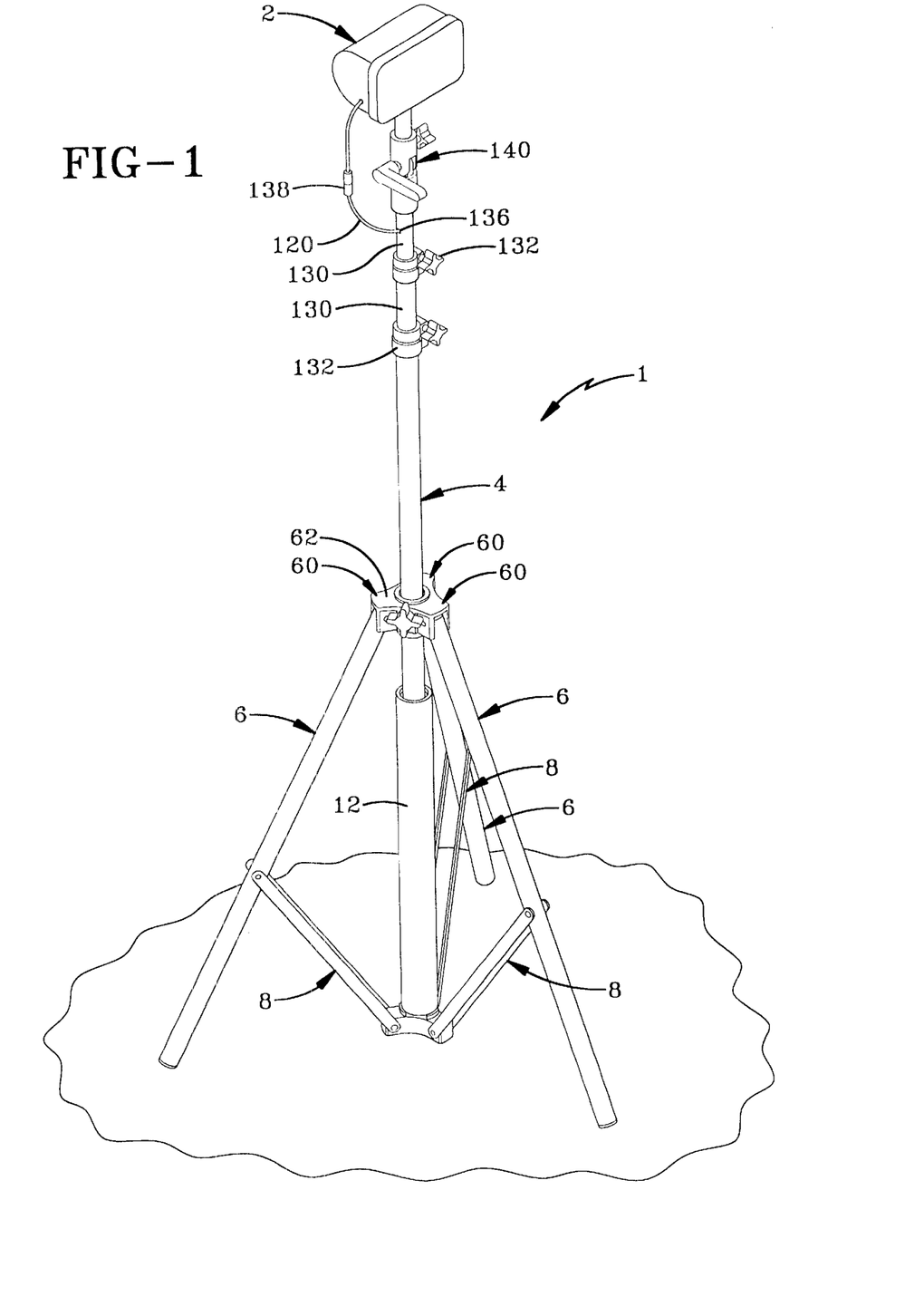
FIG. 1 is a perspective view of the tripod of the present invention.

The tripod of the present invention is indicated generally at 1 in FIG. 1 and is shown supporting a light fixture 2. Tripod 1 generally includes a center post 4, three support legs 6 pivotally attached to center post 4 and a pair of coupling links 8 pivotally attached to each support leg 6 and pivotally attached to center post 4.

Figure 2:
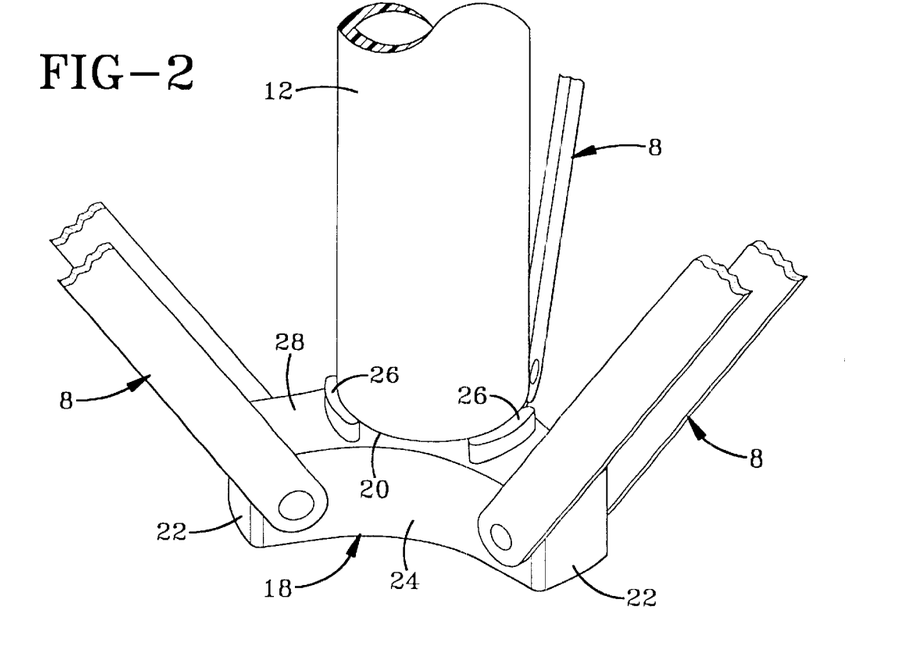
FIG. 2 is an enlarged fragmentary perspective view showing the base of the tripod of FIG. 1.

Center post 4 includes a lower tubular housing or section 12 (FIGS. 3 and 5) and an upper tubular sleeve or section 14 which telescopically engages lower tubular section 12. Upper tubular section 14 has a diameter smaller than that of lower tubular section 12 and is slidably disposed within a top end 16 of lower tubular section 12. A base 18 (FIG. 2) is attached to a bottom end 20 of lower tubular section 12 and includes three outwardly extending feet 22, the centers of which are separated from one another by approximately 120 degrees. Feet 22 are connected to one another by an inwardly curved surface 24. Three curved stops 26 extend upwardly from a top surface 28 of base 18. Stops 26 align with feet 22 and support lower tubular section 12 thereon (FIG. 6). A cylindrical bore 29 is formed centrally in top surface 28 of base 18 between stops 26. An externally threaded nipple 30 having an annular flange 32 and a bottom cylindrical bushing 34 extends upwardly from top surface 28 of base 18. Bore 29 is complimentary in shape to bushing 34 to receive bushing 34 therein allowing annular flange 32 to abut top surface 28.

Lower tubular section 12 is formed with an inner hollow center bore 40 (FIG. 6) which receives a cylindrical nut 42 adjacent bottom end 20 of lower tubular section 12. Nut 42 has an internally threaded lower section 44 and an outwardly tapered upper bore 46. Nut 42 is secured within inner bore 40 by a screw 48 which extends through the side wall of lower tubular section 12 and which is tightened into the side wall of cylindrical nut 42. Threaded section 44 of nut 42 receives nipple 30 of base 18 to secure lower tubular section 12 centrally on base 18. Bottom end 20 of lower tubular section 12 abuts and rests on stops 26 of base 18 forming a gap 50 between lower tubular section 12 and top surface 28 of base 18.

Figure 3:
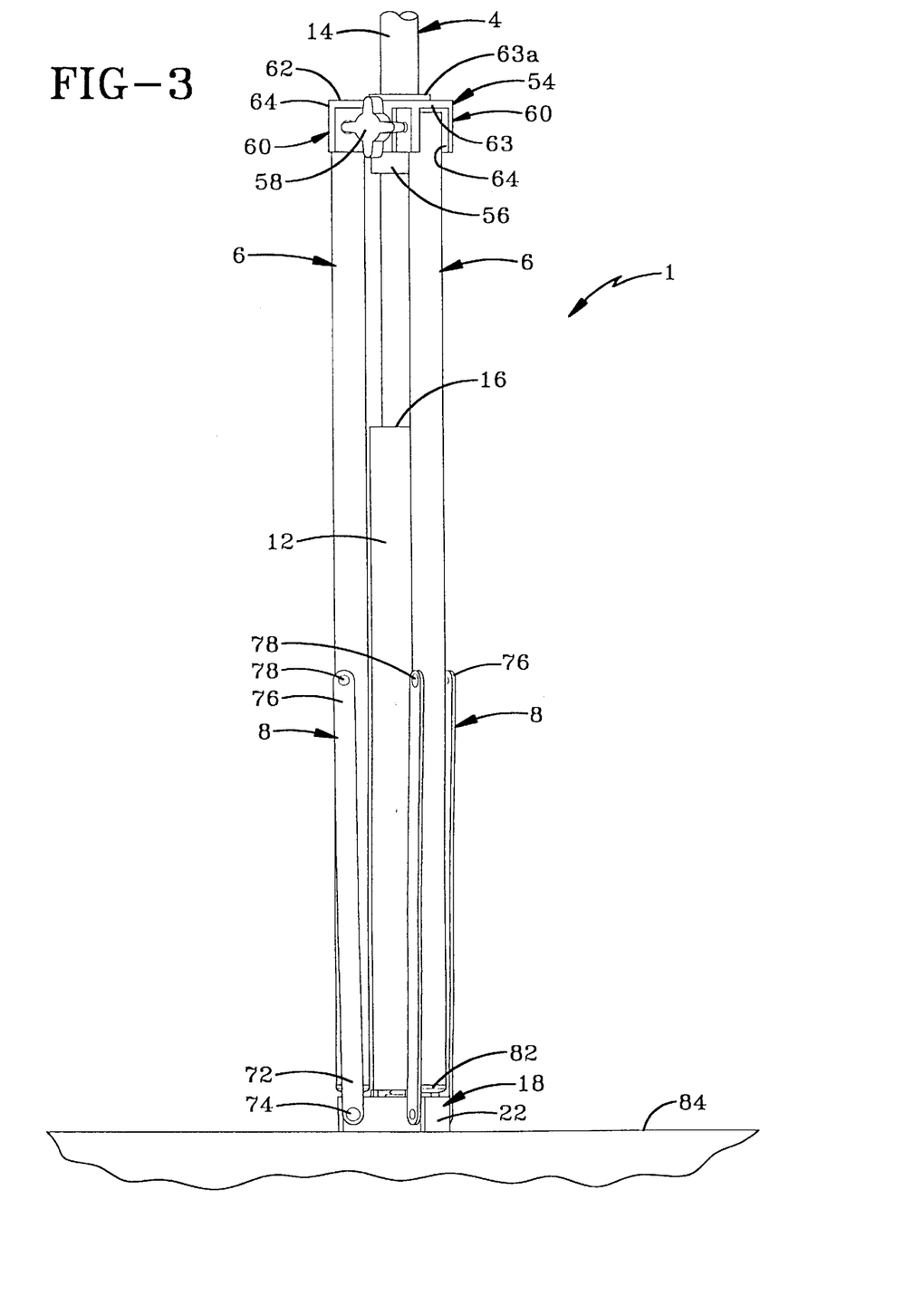
FIG. 3 is a fragmentary side elevational view of the tripod of FIG. 1 showing the support legs in a closed collapsed position.

An adjustable ring 54 (FIG. 3) is slidably disposed around upper section 14 of center post 4. Ring 54 includes a cylindrical central portion 56 (FIG. 5) which extends around upper tubular section 14, a usual adjustment knob 58 which is used to retain ring 54 in an adjusted position and three pairs of outwardly extending ears 60. Ears 60 substantially align with feet 22 of base 18. Adjustable ring 54 has a top surface 62 which creates a U-shaped housing 64 with each pair of ears 60 (FIGS. 3 and 6). Top surface 62 of ring 54 includes a small lip 63 which extends downwardly between pairs of ears 60 and a raised annular projection 63a which is positioned around and adjacent to upper tubular section 14. Each support leg 6 is pivotally mounted within one of housings 64 by a pivot pin 66. Pivot pins 66 extend between pairs of ears 60 and through support legs 6 adjacent the top end thereof.

Figure 5:
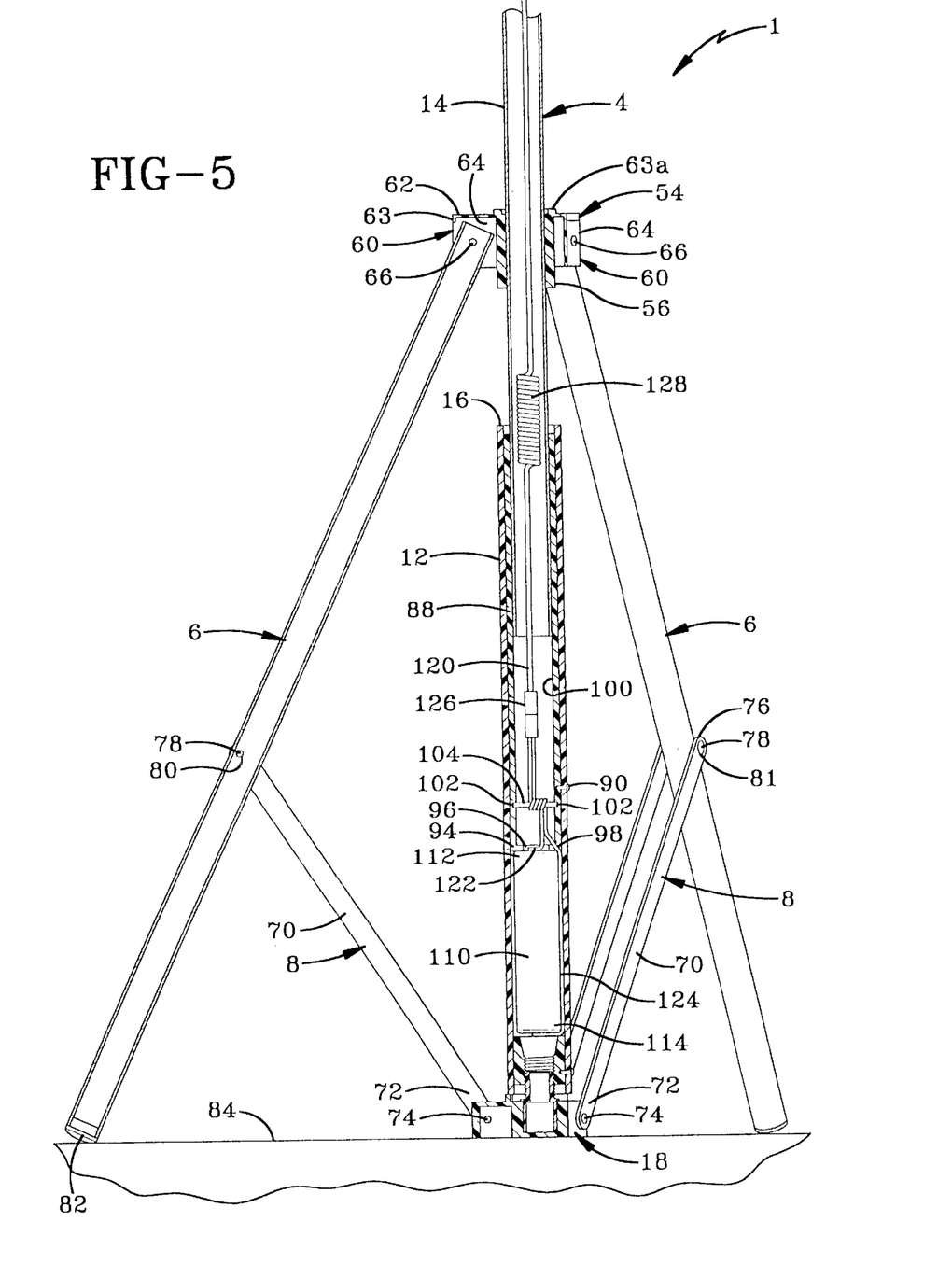
FIG. 5 is a fragmentary sectional view similar to FIG. 4.
Figure 6:
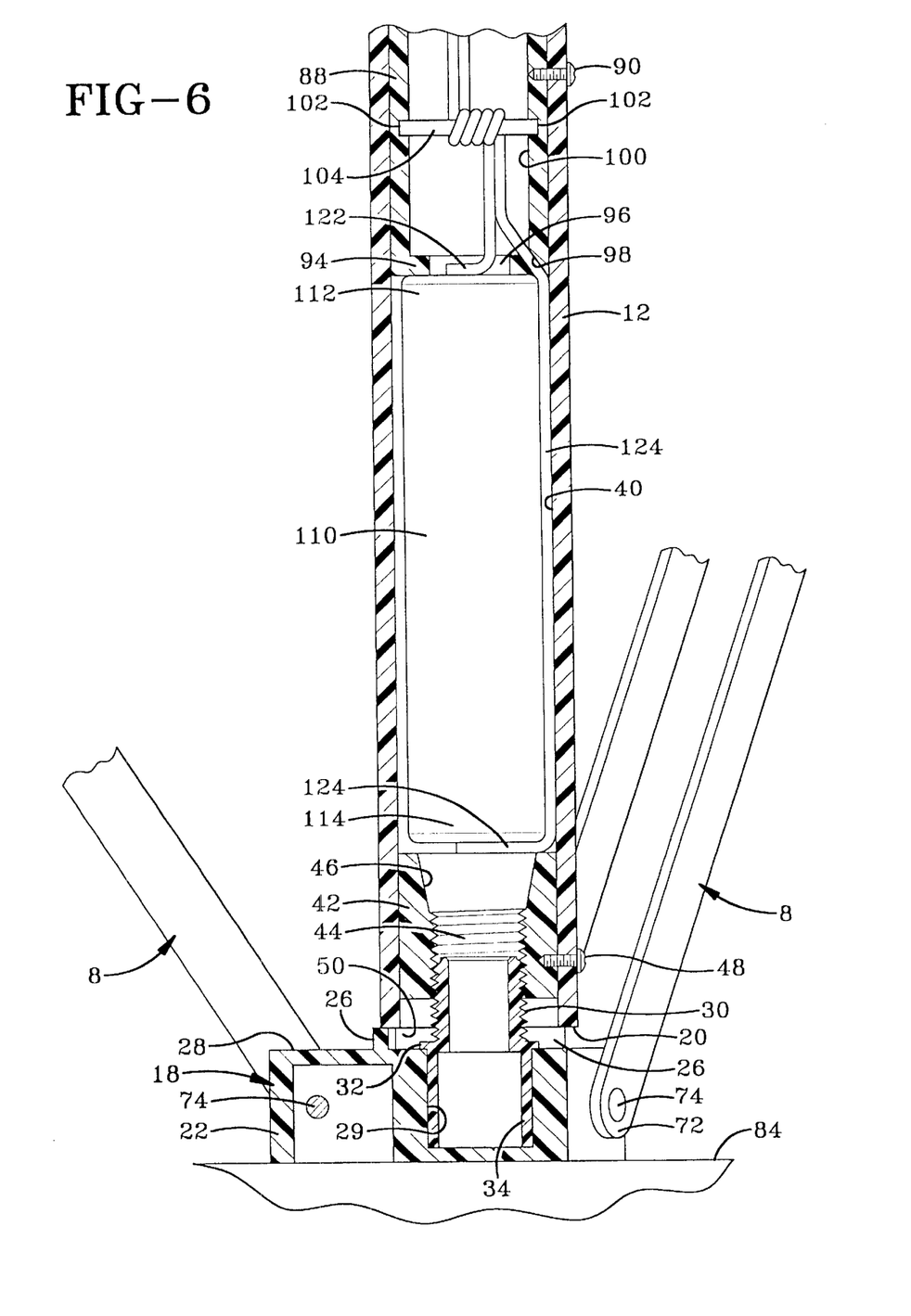
FIG. 6 is an enlarged fragmentary sectional view showing the base of the center post.

Coupling links 8 are pivotally attached at a first end 72 thereof to the sides of feet 22 of base 18 by a pivot pin 74 (FIGS. 3 and 5). Coupling links 8 extend upwardly and are pivotally attached at a second end 76 thereof to the respective aligned support leg 6 by a pivot pin 78. In accordance with one of the main features of the invention, coupling links 8 are attached to support legs 6 in an offset position (FIG. 5). A hole 80 is formed in each support leg 6 and, as shown in FIG. 5, is offset towards the outer surface or edge of support leg 6 to outwardly bias the attachment of coupling links 8 to support legs 6. Another hole 81 is formed centrally in coupling links 8 at second end 76 thereof which axially aligns with offset hole 80 of legs 6 to receive pivot pin 78 therethrough pivotally connecting couplings 8 to legs 6. The offset attachment of coupling links 8 to support legs 6 bias the support legs and coupling links slightly outwardly (FIG. 5) and facilitate an automatic opening of support leg 6 when tripod 1 is placed on a generally horizontal support surface 84, as described below. The pivotal attachment of coupling links 8 between feet 22 and support legs 6 assist the pivotal movement of support legs 6 toward and away from center post 4 and retain support legs 6 in an aligned position with feet 22 of base 18 and housing 64 of ring 54. A plastic end cap 82 extends within the lower end of each support leg 6 to support the legs on support surface 84.

A tubular sleeve 88 is positioned within lower tubular section 12 of center post 4 and is held therein by a screw 90. Tubular sleeve 88 has an outer diameter which is slightly less than the inner diameter of lower tubular housing 12 allowing tubular sleeve 88 to slidably and snugly fit within lower tubular housing 12 adjacent to and abutting the inner surface thereof. Screw 90 extends through the side wall of lower tubular housing 12 and is secured within the side wall of tubular sleeve 88. Tubular sleeve 88 has an inner diameter slightly greater than the outer diameter of upper tubular sleeve 14 allowing upper tubular sleeve 14 to slide vertically therein. Tubular sleeve 88 has a bottom end 94 formed with a central circular opening 96 and a side hole 98. An inner bore 100 is formed centrally in tubular sleeve 88 which communicates with opening 96 and hole 98 and which receives upper tubular section 14 therein. A pair of diametrically opposed notches 102 are formed in the inner surface of bore 100 for receiving an end of a cylindrical rod 104 which extends transversely across inner bore 100.

In accordance with another feature of the invention, a battery 110 is positioned within lower tubular section 12 between tubular sleeve 88 and cylindrical nut 42. Battery 110 is generally cylindrical in shape and has a top positive end 112 and a bottom negative end 114. An electrical cord 120 extends vertically within center post 4 and includes a positive wire 122 connected to positive end 112 of battery 110 and a negative wire 124 which extends through hole 98 of tubular sleeve 88 longitudinally along the outer surface of cylindrical shaped battery 110 and connects to negative end 114 of battery 110. Wires 122 and 124 wrap around cylindrical rod 104 several times to prevent the wires from breaking from their attachment to battery 110 when an upward vertical tension is applied to electrical cord 120 as described below. An electrical connector 126 connects wires 122 and 124 to a single electrical cord 120. Electrical cord 120 includes a coiled portion 128 which allows electrical cord 120 to stretch vertically when tripod 1 is in the closed position.

Upper tubular section 12 may include several additional telescopic sections 130 with usual position adjustment mechanisms 132 (FIG. 1). A hole 136 is formed in the top telescopic section 130 through which electrical cord 120 extends. An electrical connector 138 is attached to the top end of electrical cord 120 to allow light fixture 2 or other equipment such as photographic or video cameras to connect thereto. A usual equipment mount 140 is attached to the top of tripod 1 for mounting light fixture 2 thereon. Equipment mount 140 is swivelably and pivotably adjustable to allow light fixture to be adjusted to a desired position.

The bottom portion of tripod 1 is shown in FIG. 3 in a closed collapsed position. Support legs 6 extend parallel and adjacent to center post 4 within housings 64 of adjustable ring 54. Pivot pin 74 aligns with a transverse center of support legs 6 and each pair of coupling links 8 extend adjacent to and sandwich one of support legs 6. Coupling links 8 extend upwardly at a slightly outwardly offset angle to their attachment to support legs 6. Adjustment knob 58 of adjustable ring 54 is tightened to retain ring 54 to upper tubular section 14 at the position of FIG. 3. Support legs 6 are contained between ring 54 and base 18 with end caps 82 of support legs 6 extending slightly above the top surface of feet 22.

Figure 4:
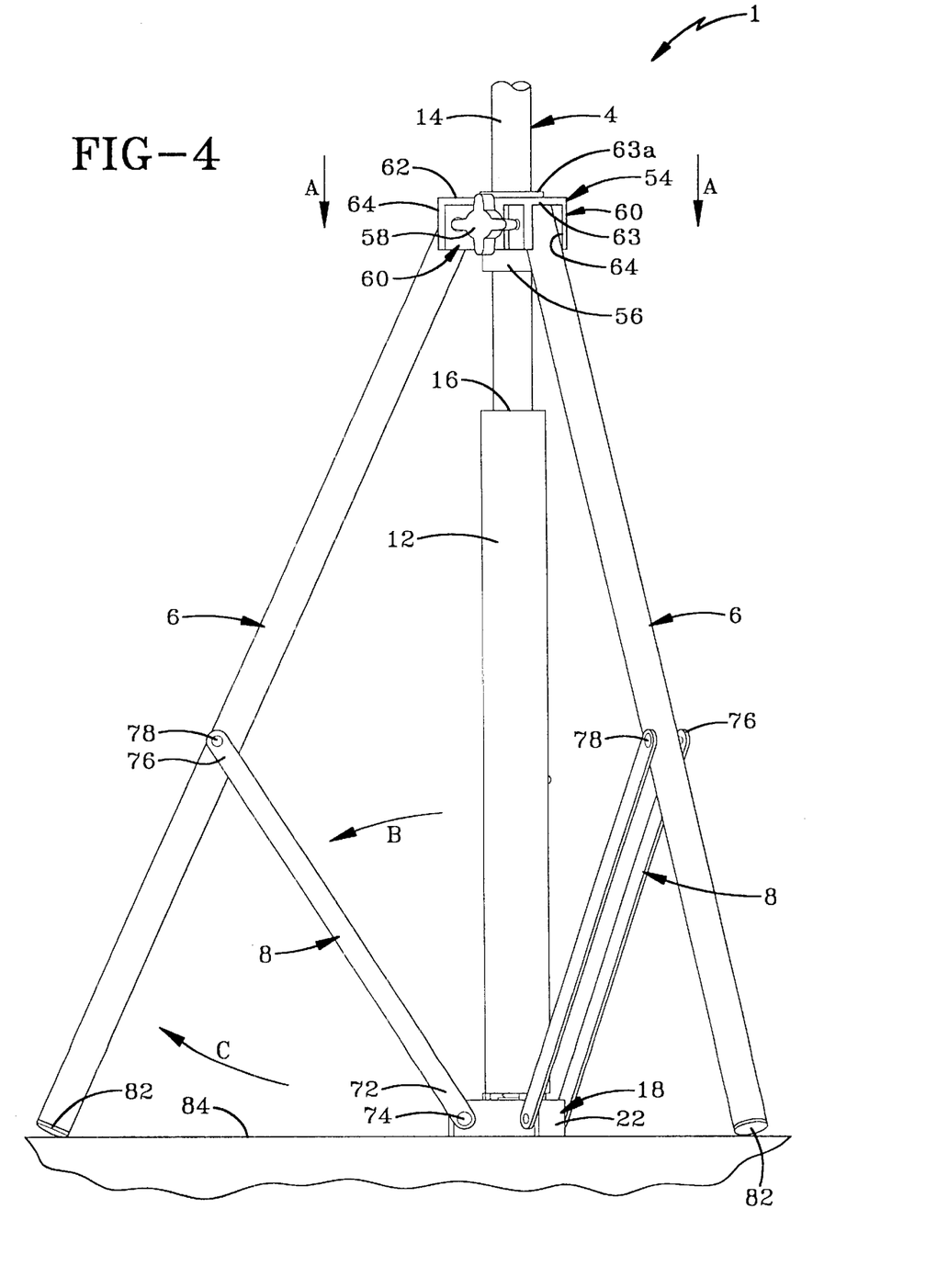
FIG. 4 is a fragmentary side elevational view similar to FIG. 3 showing the support legs in an open position.

The offset attachment of coupling links 8 to support legs 6 bias support legs 6 outwardly when tripod 1 and particularly base 18 thereof is placed on support surface 84, the weight of upper tubular section 14, the equipment mounted thereon, and the slidable telescopic engagement of upper tubular section 14 with tubular sleeve 88 creates a downward pressure in the direction of arrows A (FIG. 4). The downward pressure in the direction of arrow A causes upper tubular section 14 to slide downwardly into tubular sleeve 88 applying a downward pressure on the offset attachment of coupling links 8 to support legs 6 at pivot pin 78. As upper tubular section 14 slides downwardly, the rigid attachment of adjustment ring 54 pushes support legs 6 downwardly applying a downward pressure at the offset outwardly biasing the pivotal connection of coupling links 8 at pivot pin 78. The pivotal connection of coupling links 8 at pivot pin 74 allows coupling links 8 to pivot outwardly in the direction of arrows B.

The downward pressure in the direction of arrow A causes coupling links 8 to pivot outwardly in the direction of arrow B which, in turn, causes support legs 6 to pivot outwardly in the direction of arrow C. Upper tubular section 14 continues to slide downwardly within tubular sleeve 88 in the direction of arrows A until end caps 82 of support legs 6 contact support surface 84 retaining tripod 1 in an open and stable position (FIG. 4).

Tripod 1 is easily and automatically closed by grasping upper tubular section 14 at a position above adjustment ring 54 and lifting tripod 1 upwardly off of support surface 84. When tripod 1 is lifted upwardly, the weight of lower tubular section 12 and battery 110 causes tubular sleeve 88 to slide downwardly along upper tubular section 14. As tubular sleeve 88 and lower tubular section 14 slide away from adjustment ring 54, the vertical force causes support legs 6 to pivot in a direction opposite of that of arrow C while coupling links 8 pivot in a direction opposite to that of arrow B until legs 6 and coupling links 8 return to their closed positions of FIG. 3.

Eventually, battery 110 will lose its charge and must be recharged. Battery 110 may be recharged simply by plugging a recharger into cord 120 thereby assuring that battery 110 need not be removed from lower tubular housing 12. However, battery 110 will eventually need to be replaced as all batteries including rechargeable batteries eventually are unable to accept additional charge. To that end, battery 110 is removed from lower tubular housing 12 (FIG. 6) by twisting lower tubular section 12 and unscrewing cylindrical nut 42 from threaded nipple 30. When cylindrical nut 42 has disengaged nipple 30, lower tubular section 12 will slide upwardly along upper tubular section 14. Screw 48 is removed from its engagement with nut 42 and screw 90 is released from its engagement with tubular sleeve 88. Bottom end 20 of lower tubular section 14 is cleared from base 18 to allow access thereto. Nut 42 is removed from lower tubular section 12 allowing battery 110 and tubular sleeve 88 to slide downwardly out bottom end 20. Negative wire 124 is removed from negative end 114 of battery 110 and positive wire 122 is removed from positive end 112 of battery 110 allowing a new battery 110 to be connected to wires 122 and 124, or allowing existing battery 110 to be recharged. Coiled portion 128 of electrical cord 120 allows cord 120 to stretch downwardly a distance sufficient to allow access to battery 110. Tubular sleeve 88, new battery 110 and cylindrical nut 42 slide back into the respective positions within lower tubular section 110. Screws 48 and 90 are replaced to their positions of FIG. 6 securing nut 42 and tubular sleeve 88, respectively, within lower tubular section 12. Lower tubular section 12 is placed back on nipple 30 and cylindrical nut 42 is tightened until bottom end 20 of lower tubular section 12 abuts stops 26.

Figure 7:
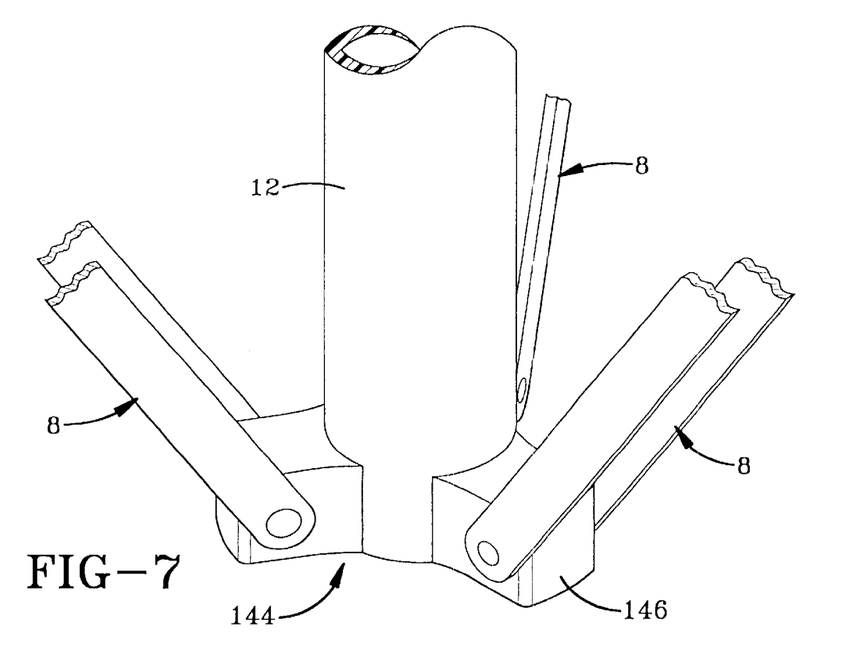
FIG. 7 is an enlarged fragmentary perspective view showing a second embodiment of the base.
Figure 8:
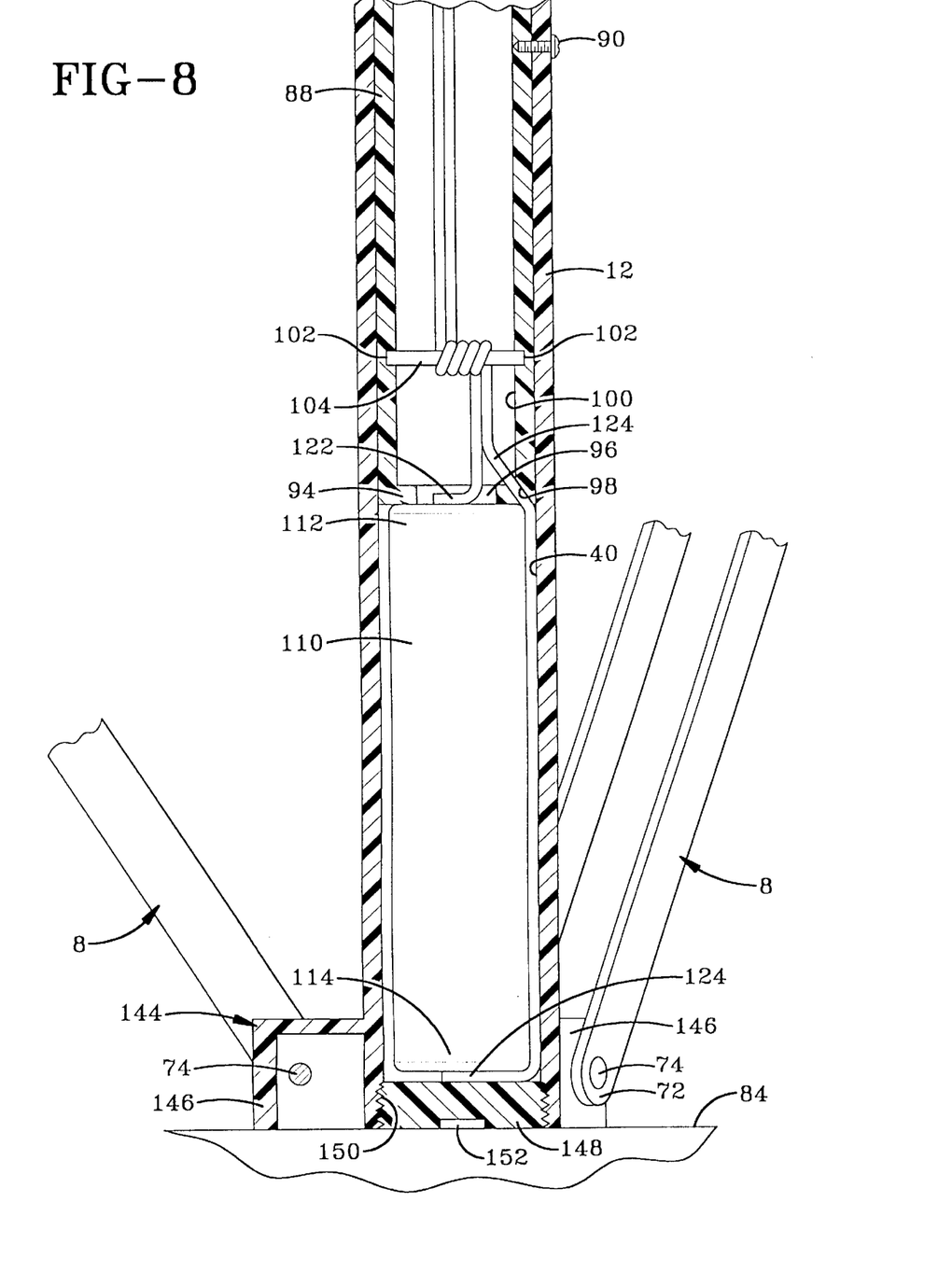
FIG. 8 is an enlarged fragmentary sectional view of the base of FIG. 7.

A second embodiment of base 18 is shown in FIGS. 7 and 8 and is indicated generally at 144. Base 144 includes three outwardly extending feet 146 similar to feet 22 of base 18 which are formed integrally with an outer surface of lower tubular section 12. Base 144 is free of cylindrical nut 42 (FIG. 8) and includes a threaded screw cap 148 which is tightened into an internally threaded portion 150 of bore 100. A slot 152 is formed in an outer surface of screw cap 148 to receive the end of a screwdriver or coin which may be used to open screw cap 148. Base 144 provides direct access to battery 110 and facilitates easy and quick replacement thereof.

Additionally, the inventions included in tripod 1 may be utilized with any number of support legs 6 without departing from the spirit of the present invention.

Accordingly, support legs 6 of tripod 1 automatically open and close when the tripod is placed on support surface 84 and removed from support surface 84. The telescopically sliding engagement of upper tubular section 14 within lower tubular section 12 and the offset attachment of coupling links 8 to support legs 6 causes support legs 6 to pivot outwardly in an open position when tripod 1 is placed on the support surface. Conversely, the weight of battery 110 within lower tubular section 12 and the telescopic engagement of upper tubular section 14 within lower tubular section 12 causes coupling links 8 and support legs 6 to automatically pivot from the open position to a closed collapsed position. The offset attachment of coupling links 8 to support legs 6 bias the coupling links at a slightly outward angle whereby a downward pressure applied thereto causes the coupling links to pivot the support legs outwardly. The biasing of coupling links 8 on support legs 6 allow the support legs to close to a vertical position parallel and adjacent to center post 4 requiring a relatively small amount of space to store and transport tripod 1, unlike prior art tripods which require the support legs to extend outwardly at an angle even when the prior art tripods are in the closed position. Further, battery 110 is contained within center post 4 to provide an attractive and convenient battery storage which maintains a balanced configuration of the tripod. Bases 18 and 144 allow battery 110 to be easily replaced or recharged.

Accordingly, the improved tripod is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tripod is constructed and used, the characteristics of the construction, and the advantageous, new and useful results obtained; the new and useful structures, devices, elements, arrangements, parts and combinations, are set forth in the appended claims.

What is claimed is:

1. A vertical support, comprising:
   a post having a top and a bottom; the post including an upper section and a lower section;
   the lower section telescopingly engaging the upper section;
   at least two legs having an inner edge and an outer edge;
   each of the legs attached at a first pivot to the upper section of the post;
   the legs being moveable between open and closed positions;
   each of the legs having a longitudinal centerline with the inner edge and outer edge disposed on either side of the centerline;
   the inner edge being disposed intermediate the longitudinal centerline and the post;
   a coupling link attached to each leg;
   the coupling link having a first end and a second end;
   the first end of the coupling link connected to the lower section of the post;
   the second end of the coupling link connected to the leg at a second pivot; and
   the second pivot being positioned adjacent the outer edge of the leg outside the longitudinal centerline of the leg so as to outwardly bias the links with respect to the legs so that the legs automatically move to the open position when the central post is placed on a support surface.

2. The support of claim 1, wherein each coupling link includes a pair of links positioned on either side of the leg.

3. The support of claim 1, wherein the connection between the second end of the link and the leg includes a pivot pin.

4. The support of claim 1, wherein the second end of each link extends beyond the outer edge of the leg.

5. The support of claim 1, further comprising a battery carried in the lower section of the post, the weight of the battery helping the legs move to the closed position when the vertical support is lifted upwardly.

6. The support of claim 5, wherein the lower section of the post slides over the upper section of the post.

7. The support of claim 1, wherein the upper section of the post selectively slides with respect to the pivotal connection between the upper section of the post and the legs.

8. The support of claim 7, further comprising a ring carried by the upper section of the post and a clamp carried by the ring; the clamp selectively engaging the upper section of the post to retain the ring with respect to the upper section of the post; the legs being pivotally connected to the ring.

9. The support of claim 1, wherein the first pivot is disposed substantially on the longitudinal centerline; a reference line passing through the first pivot and the second pivot being nonparallel with the longitudinal centerline.

10. A vertical support, comprising:
    a center post having a top and a bottom; the center post including a lower section and an upper section;
    the upper section of the post sliding inside the lower section;
    at least two legs attached at a first pivot to the upper section and movable between open and closed positions;
    a coupling link attached to each leg;
    the coupling link having a first end and a second end;
    the first end of the coupling link connected to the lower section of the post;
    the second end of the coupling link connected to the leg;
    the lower section of the post being in a first position when the legs are in the open position and a second position when the legs are in the closed position;
    the first position of the lower section of the post being closer to the first pivot than the second position of the lower section of the post; and
    a battery disposed in the lower section of the center post; the battery moving with the lower section of post between the first and second positions.

11. The support of claim 10, wherein the upper section of post automatically slides out of the lower section of post until the legs move to the closed position when the upper section of post is lifted away from the lower section of post.

12. The support of claim 11, the upper section of post is free of devices that retain the position of the upper section of the post with respect to the lower section of the post.

13. A method of setting up and collapsing a vertical support on a surface, the method comprising the steps of:
    providing a support having a center post having a lower section and an upper section; the lower section of the post having a lower end; the upper section of the post sliding with respect to the lower section of the post; at least two legs attached at a first pivot to the upper tubular section and movable between open and closed positions; a coupling link attached to each leg; the coupling link having a first end and a second end; the first end of the coupling link connected to the lower section of the post above the lower end of the lower section of the post; and the second end of the coupling link connected to the leg;
    placing the lower end of the lower section on the surface and lowering the upper section of the post causing the legs to move from the closed position to the open position to set up the support;
    grasping any portion of the upper section of the post;
    lifting the upper section of the post away from the lower section of the post causing the legs to move from the open position to the closed position; the grasping and lifting steps being free of the step of releasing a clamping mechanism that holds the upper section of the post with respect the lower section of the post;
    locating the connection between the second end of the coupling link and the leg adjacent the outer edge of the leg; and
    creating an outwardly directed force on the legs by engaging of the lower end of the lower section with the surface and lowering the upper section of post.

* * * * *